(12) United States Patent
Reno et al.

(10) Patent No.: US 9,462,011 B2
(45) Date of Patent: *Oct. 4, 2016

(54) DETERMINING TRUSTWORTHINESS OF API REQUESTS BASED ON SOURCE COMPUTER APPLICATIONS' RESPONSES TO ATTACK MESSAGES

(71) Applicant: CA, Inc., Islandia, NY (US)

(72) Inventors: James D. Reno, Scotts Valley, CA (US); Thomas E. Hamilton, III, Sudbury, MA (US); Kenneth William Scott Morrison, New Westminster (CA)

(73) Assignee: CA, Inc., New York, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/291,763

(22) Filed: May 30, 2014

(65) Prior Publication Data

US 2015/0350249 A1 Dec. 3, 2015

(51) Int. Cl.
*G06F 12/16* (2006.01)
*H04L 29/06* (2006.01)

(52) U.S. Cl.
CPC ....... *H04L 63/1441* (2013.01); *H04L 63/1433* (2013.01)

(58) Field of Classification Search
CPC ..................................... H04L 63/14–63/1433

USPC ............... 713/153, 168, 170, 176; 726/4, 5, 726/22–25
See application file for complete search history.

(56) References Cited

U.S. PATENT DOCUMENTS

| | | | |
|---|---|---|---|
| 6,199,102 B1* | 3/2001 | Cobb ................ | H04L 12/585 709/202 |
| 2010/0134275 A1* | 6/2010 | Fitzgerald .............. | G06F 21/88 340/539.13 |
| 2010/0169974 A1* | 7/2010 | Calendino .............. | G06F 21/52 726/25 |
| 2013/0166703 A1* | 6/2013 | Hammer ............ | H04L 41/5054 709/220 |
| 2014/0189098 A1* | 7/2014 | Magill ................ | H04L 63/1425 709/224 |

* cited by examiner

*Primary Examiner* — Alexander Lagor
(74) *Attorney, Agent, or Firm* — Myers Bigel & Sibley, P.A.

(57) ABSTRACT

A method includes receiving an application programming interface (API) request from a source computer application that is directed to a destination computer application. An attack response message that is configured to trigger operation of a defined action by the source computer application is sent to the source computer application. Deliverability of the API request to the destination computer application is controlled based on whether the attack response message triggered operation of the defined action. Related operations by API request risk assessment systems are disclosed.

22 Claims, 7 Drawing Sheets

Determine whether the attack response message triggered operation of the error handling action based on content of a message from the source computer application received after the attack response message was sent — 700

Determine whether the attack response message triggered operation of the error handling action based on whether a message is received from the source computer application within a threshold time after the attack response message was sent — 702

DETERMINING TRUSTWORTHINESS OF API REQUESTS BASED ON SOURCE COMPUTER APPLICATIONS' RESPONSES TO ATTACK MESSAGES

TECHNICAL FIELD

The present invention relates generally to a networked system of computers and, more particularly, to the management of application programming interface requests through applications on computers.

BACKGROUND

Attacks carried out through the Internet against computer applications and computers are increasing in frequency and sophistication. Tools are presently available to detect and defend against attacks that are carried out through the Internet against HTML interface web applications. However, these tools are strictly targeted at those specific types of attacks. This results in many other types of computer systems, such as computer systems hosting cloud services, remaining vulnerable to attack although they may have a much greater consequential harm if compromised.

SUMMARY

Some embodiments disclosed herein are directed to methods that include receiving an application programming interface (API) request from a source computer application that is directed to a destination computer application. An attack response message configured to trigger operation of a defined action by the source computer application, is sent to the source computer application. Deliverability of the API request to the destination computer application is controlled based on whether the attack response message triggered operation of the defined action.

Some other embodiments are directed to an API request risk assessment system that includes processor circuitry and memory circuitry coupled to the processor circuitry. The memory circuitry includes computer readable program code that when executed by the processor circuitry causes the processor circuitry to perform operations that receiving an API request from a source computer application that is directed to a destination computer application. The operations further include sending to the source computer application an attack response message configured to trigger operation of a defined action by the source computer application, and controlling deliverability of the API request to the destination computer application based on whether the attack response message triggered operation of the defined action.

It is noted that aspects described with respect to one embodiment disclosed herein may be incorporated in different embodiments although not specifically described relative thereto. That is, all embodiments and/or features of any embodiments can be combined in any way and/or combination. Moreover, methods, systems, and/or computer program products according to embodiments will be or become apparent to one with skill in the art upon review of the following drawings and detailed description. It is intended that all such additional methods, systems, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
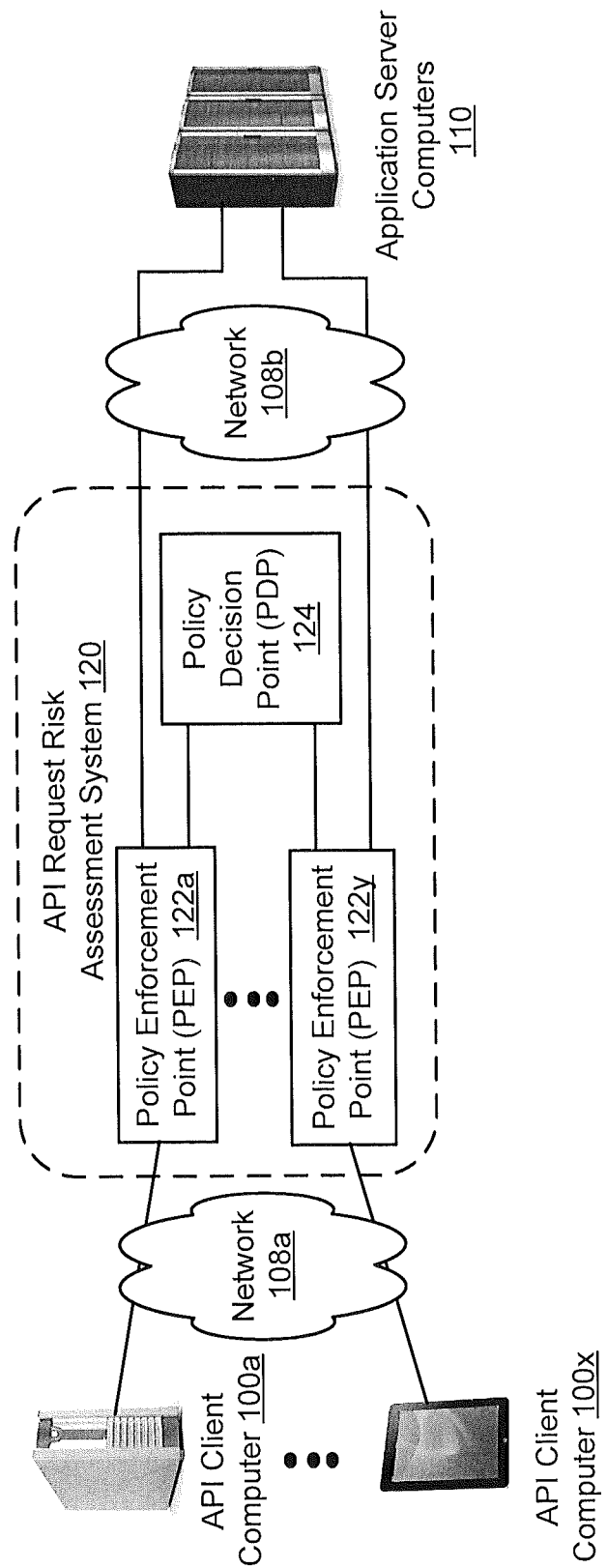
FIG. 1 is a block diagram of a computer system that includes an API request risk assessment system that intercepts and controls deliverability of API requests from API client computers to application server computers, in accordance with some embodiments.

Various embodiments will be described more fully hereinafter with reference to the accompanying drawings. Other embodiments may take many different forms and should not be construed as limited to the embodiments set forth herein. Like numbers refer to like elements throughout.

Some embodiments are directed to reducing security risks associated with the processing of application programming interface (API) requests that are received through APIs of applications on computers, such as applications providing application-to-application Web services or other API application endpoints. An unauthentic (e.g., fraudulent) application may observe or otherwise know the syntax of API requests for accessing a destination computer application (e.g., cloud service), and may operate to attempt to imitate an authentic instance of a source computer application to, for example, misuse/attack services and/or resources of the destination computer. However the unauthentic application is very unlikely to include program code that produces the same observable output from a defined action as the authentic source computer application and, in particular, to include program code that triggers operation of the defined action under the same triggering event as the authentic source computer application.

Various embodiments disclosed herein are directed to an API request risk assessment system (also referred to as "risk assessment system" for brevity) that determines trustworthiness of a source computer application (e.g., application on client computer). The risk assessment system receives an API request from the source computer application, and responds by sending to the source computer application an attack response message configured to trigger operation of a defined action by the source computer application. The risk assessment system then controls deliverability of the API request to a destination computer application based on whether the attack response message triggered operation of the defined action.

The defined action may be a defined one of a plurality of different actions that an authentic application is known to be configured to perform based on content received in a response to an API request from the authentic application. For example, an authentic source computer application is known to have a plurality of actions that can be triggered based on content of a response message to an API request. One of the actions, such as an API protocol sequence, may be rarely used and only invoked responsive to a particular content in a response message. Because an unauthentic source computer application is not expected to be configured to carry out all of the plurality of actions and, more particularly, the rarely used one of the actions, the risk assessment system can assess the trustworthiness of a source computer application (e.g., whether it is an authentic or unauthentic application) from which an API request is received by sending an attack response message that is configured to trigger operation of the rarely used one of the actions and/or another defined one of the actions that an unauthentic application is not expected to be configured to perform. The risk assessment system can control deliverability of the API request to the destination computer application based on whether the attack response message was determined to have triggered operation of the corresponding defined action by the source computer application.

The defined action may include an error handling action that is performed by an authentic application based on certain content being received in a response to an API request from the authentic application. For example, an authentic source computer application may be known to be limited to receiving a defined maximum length of content (e.g., due to input buffer size limitation) and/or to receiving parameters in a defined order in a response message to an API request. A response message having content that exceeds the defined maximum length and/or having parameters arranged differently than the defined order triggers operation of an error handling action by the authentic source computer application that sends a message having defined content toward the destination computer application and which can be observed by the risk assessment system. In sharp contrast, an unauthentic application is not aware of the error handling action and, furthermore, the particular content and/or parameters that triggers operation of the error handling action.

The risk assessment system can therefore assess the trustworthiness of a source computer application (e.g., whether it is an authentic or unauthentic application) from which an API request is received by sending an attack response message that is configured to trigger operation of an error handling action by the source computer application, and determining whether the attack response message triggered operation of the error handling action based on whether it observed a message having defined content or other observable output from the source computer application indicating operation of the error handling action. The risk assessment system can control deliverability of the API request to the destination computer application based on whether the attack response message was determined to have triggered operation of the error handling action.

These and other operations by a risk assessment system are described below with regard to FIGS. 1-12.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests. Also as used herein, an "attack response message" can be any type of message that is sent to a source computer application and which is configured to trigger operation of a defined action by the source computer application.

Although some embodiments are described in the context of a server computer determining the trustworthiness of an application on a client computer, these and other embodiments are not limited thereto as they may be performed by a client computer to determine the trustworthiness of an application on a server computer. Accordingly, a source computer and a destination computer may be used interchangeably to refer to client computers, server computers, etc.

FIG. 1 is a block diagram of embodiments of a computer system that includes an API request risk assessment system 120 that intercepts, or observes without intercepting, API requests, and controls deliverability of API requests from API client computers 100a-100x to application server computers 110 for processing.

Referring to FIG. 1, The risk assessment system 120 receives API requests (e.g., Web service API calls, RESTful API requests, etc.) through one or more data networks 108a from applications processed by one or more API client computers 100a-100x. An application processed by one of the API client computers which generates an API request is also referred as one type of "source computer application" for brevity. The API requests are directed to applications on one or more of the application server computers 110 for processing, which are also referred as one type of "destination computer application" for brevity.

The risk assessment system 120 responds to receipt of an API request by sending back to the application on the source computer application an attack response message configured to trigger operation of a defined action by the source computer application, and controls deliverability of the API request to the destination computer application based on whether the attack response message triggered operation of the defined action.

The API client computers 100a-100x or other types of source computers can be any type of computer that processes applications to generate API requests, such as Web service API calls, RESTful API requests, etc., and may include, but are not limited to desktop computers, laptop computers, tablet computers, smart phones, application servers, and mainframe computers. The application server computers 110 and other types of destination computers may correspondingly be any type of computers having applications that expose services and/or resources through APIs and process API requests received through APIs, such as Web service API calls, RESTful API requests, etc., and may include, but are not limited to mainframe computers, application server equipment, desktop computers, laptop computers, tablet computers, and smart phones.

As will be explained in further detail below, the risk assessment system 120 may generate a risk assessment score based on an observed message or other action by the source computer application triggered by its receipt of the attack response message. The risk assessment score indicates a level of trustworthiness of the source computer application, such as whether the source computer application is sufficiently identifiable as being an application that is authorized to use services and/or resources provided by one or more of the application server computers 110. The risk assessment system 120 can control deliverability of the API request to the destination computer application based on the risk assessment score.

In one embodiment, a risk assessment score of zero indicates the highest likelihood that an API request was received from an authentic application that is authorized to access services and/or resources of one or more of the application server computers 110 through the associated APIs or, in other words, the lowest potential risk of the API request being received from an unauthentic application (e.g., an application falsely imitating an authentic application for purposes of misusing/attacking services and/or resources of one or more of the application server computers 110). In contrast a risk assessment score of 100 indicates the lowest likelihood that an API request was received from an authentic application or, in other words, the highest potential risk of the API request being received from an unauthentic application.

Because the risk assessment is performed by the risk assessment system 120 and may be performed before the API request reaches and is processed by an application on any of the application server computers 110, the application can be protected from potential damage. Moreover, any checking of the API request by the application or another component of the application server computers 110 to obtain a desired level of security when processing API requests can be reduced or eliminated.

As illustrated in FIG. 1, operations of the risk assessment system 120 may reside in a plurality of policy enforcement points (PEPs) 122a-122y and a policy decision point (PDP) 124. One or more of the PEP's 122a-122y may be processed by a same computer host as the PDP 124, or may be processed on physically separate computer hosts that have different network addresses and communicate with each another through one or more data networks (e.g., 108a/b, etc). Accordingly, the PDP 124 may operate as a centralized policy decision point for the plurality of geographically dispersed and communicatively connected PEP's 122a-122y that control deliverability of API request from any number of source computers (e.g. API clients computers 100a-x) to any number of destination computers (e.g., application server computers 110). Although a single PDP 124 and two PEPs 122a-y are shown in FIG. 1, it is to be understand that any number of PDP 124 and PEP 122 may be used with various embodiments disclosed herein. Moreover, one or more of these embodiments may be implemented in any type of computer and are not limited to use in a PDP and/or PEP.

The PEP(s) 122 can be responsible for generalized message processing of Web service and other API requests. These requests can include SOAP messages using a variety of transport bindings including, but not limited to, HTTP(s), Message-Oriented Middleware (MOM) such as ActiveMQ, email, TCP sockets, (s)FTP(s), etc). API requests following the RESTful architectural pattern can include HTTP(s) transport and message content types that include, but are not limited to, simple text, binary attachments, XML documents, JSON structures, etc. The PEP(s) 122 can also be responsible for application of rules (policy) to Web services or other API requests. The rules can define an algorithm applied to an API request in flight that has not yet been delivered to the destination computer. The algorithm can control one or more of: identification of an application on a source computer that output the API request (based on one or more embodiments disclosed herein); authentication of credentials associated with the API request; validation of content of the API request; modification of content of the API request; and routing of the API request content to the destination computer 110 and/or another computer of the system and/or another system. Evaluation of these steps may occur locally for performance reasons; however, some steps may leverage additional external infrastructure elements such as directories, databases, or various PDPs such as described herein.

The PDP can be a rules engine that is optimized for risk evaluation of API requests from source computer applications based on indications of whether a defined action is performed by a source computer application responsive to an attack response message. The rules can include rule sets that control generation of attack responses messages to source computer applications based on knowledge of what message characteristics will trigger operation of defined actions by different types of the source computer applications, and can include rule sets that determine whether defined actions are performed by the source computer applications responsive to the attack response messages.

Rule sets that detect typical authentic applications and/or unauthentic applications can be defined or developed by learning-based processes over time. In addition, rule sets can be customizable to detect emerging threats or to accommodate unique security or other needs of particular destination computers and/or applications thereon that process API requests.

Various potential advantages that may be obtained by separating operations of the PEP from operations of the PDP may include, but are not limited to: 1) enabling administrative separation of concerns between the administration of PDP risk-associated policy and rule sets and the administration of PEP message-in-flight handling policy (including remediation action(s) based on trustworthiness of API requests); and/or 2) allowing a single PDP to serve many PEP instances which can provide favorable reuse efficiencies for enterprise systems having many API clients and/or many application servers.

Figure 2:
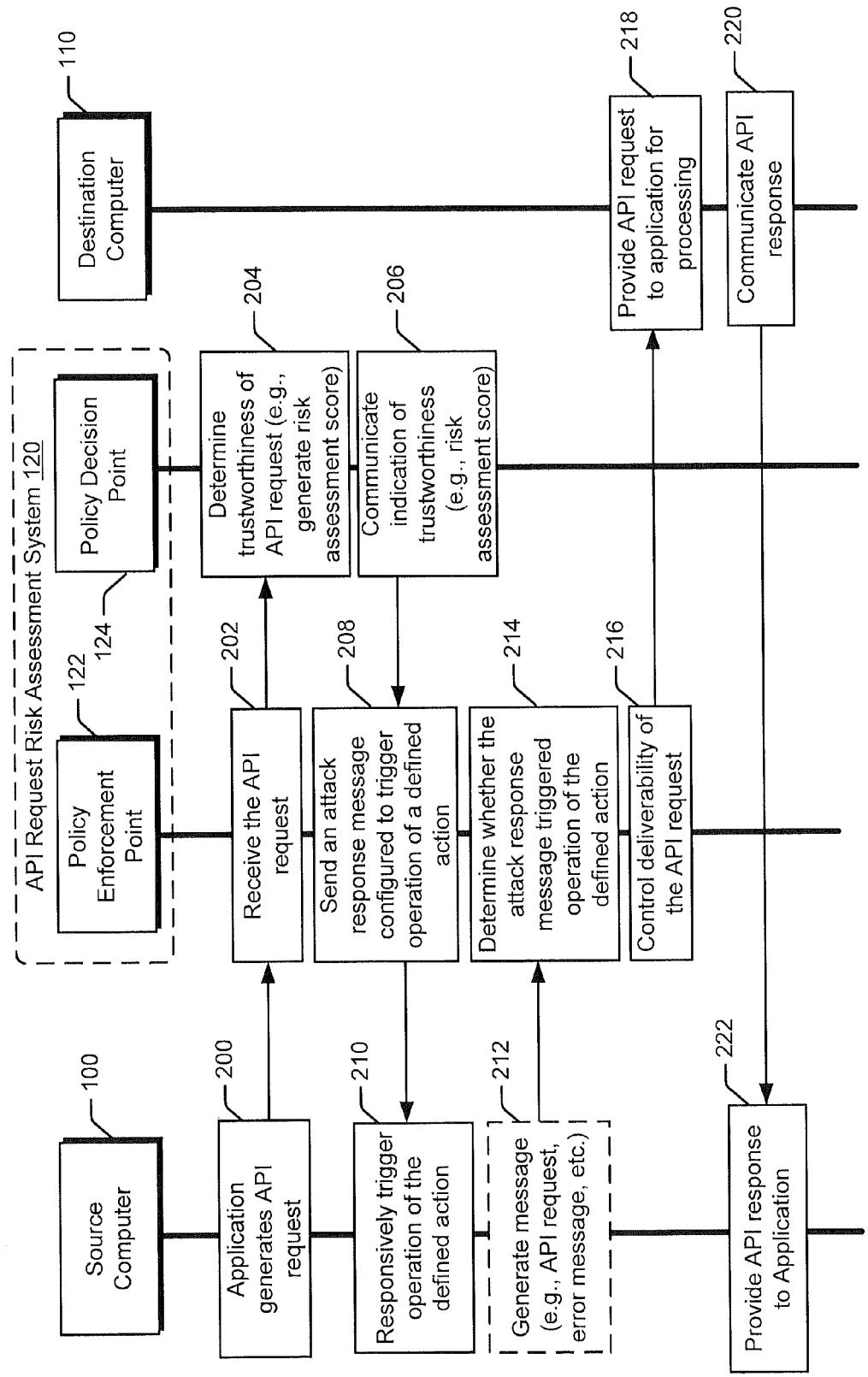
FIG. 2 is a flowchart of operations and information flows that may be performed by the system components of FIG. 1, in accordance with some embodiments.

FIG. 2 is a flowchart of operations and information flows that may occur between the system components of FIG. 1, in accordance with some embodiments. Referring to FIG. 2, an application processed by the source computer 100 (e.g., API client computer 100a) generates (block 200) an API request that is communicated through a data network for processing by one or more applications on a destination computer 110 (e.g., application server computer 110).

The PEP 122 receives (block 202) the API request, and may be configured to intercept the API request to prevent it from reaching the destination computer 110 without the PEP 122 first authorizing its delivery to the destination computer 110. The PEP 122 communicates the API request (e.g., the entire API request or information characterizing the API request) to the PDP 124. The PDP 124 controls when the source computer application is authenticated or otherwise tested using an attack response message sent back to the source computer application to attempt to trigger a defined action by the source computer application.

The PDP 124 may determine (block 204) trustworthiness of the API request and communicate (block 206) an indication of the trustworthiness to the PEP 122 to control whether the source computer application is authenticated or otherwise tested. An API request that has less than a threshold level of trustworthiness can cause the PDP 124 to initiate sending of the attack response message by the PEP 122. As will be explained in further detail below, the PDP 124 may generate a risk assessment score to indicate a level of trustworthiness of the API request. The PEP 122 can, based on the risk assessment score, selectively send (block 208) to the source computer application an attack response message configured to trigger operation of a defined action by the source computer application.

For example, API requests that are deemed to have insufficient trustworthiness, based on a risk assessment score or which do not satisfy a defined risk assessment rule, result in the PEP 122 sending the attack response message to authenticate or otherwise test the source computer application. In contrast, API requests that are deemed to have sufficient trustworthiness result in the PEP 122 bypassing without performing block 208 (i.e., not send an attack response message) and, instead, proceeding with forwarding the API request to the destination computer 110 for processing by the destination computer application.

In the example of FIG. 2, the source computer 100 receives the attack response message, which is provided to the application that generated the API request. If the source computer application is configured to process the attack response message in a same way as an authentic application, then the attack response message triggers operation (block 210) of a defined action. The defined action may generate (block 212) a message that is sent to the PEP 122 and/or that is sent elsewhere but is directly or indirectly observable by the PEP 122. The defined action may alternatively or additionally generate an event, such as by storing a value or string in a register or memory location, that is directly or indirectly observable by the PEP 122.

The PEP 122 determines (block 214) whether the attack response message triggered operation of the defined action. The PEP 122 controls (block 216) deliverability of the API request to the destination computer 110 for processing based on whether the attack response message triggered operation of the defined action.

The PEP 122 may generate a risk assessment score based on whether the attack response message is determined (block 214) to have triggered operation of the defined action, where the risk assessment score indicating a level of trustworthiness of the source computer application. The PEP 122 can then control (block 216) deliverability of the API request to the destination computer application based on the risk assessment score.

When the PEP 122 delivers the API request, the destination computer 110 processes (block 218) the API request to generate an API request response (e.g., by retrieving or generating information requested by the API request), and communicates (block 220) the API request response to the source computer 100. The source computer 100 receives and provides (block 222) the API request response to the application on the source computer 100 for processing.

Figure 3:
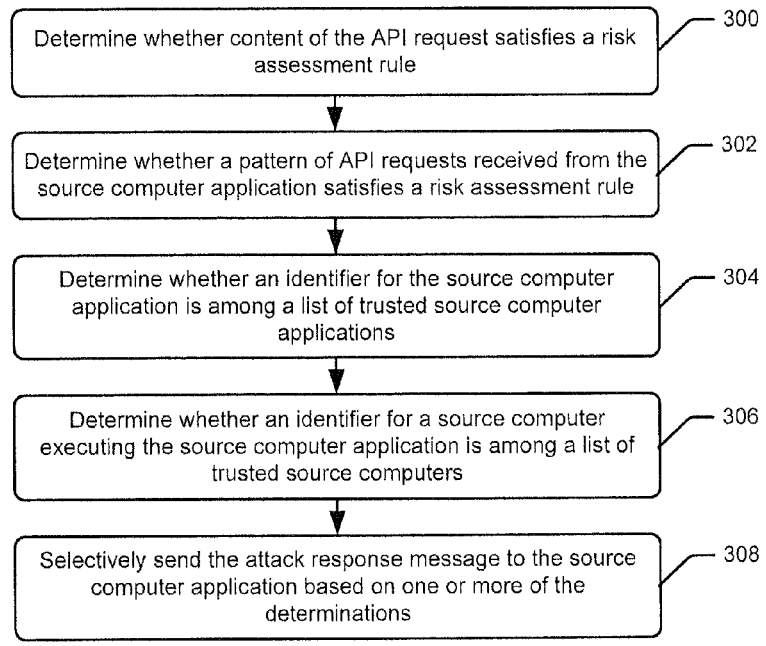
FIGS. 3-11 are flowcharts that illustrate operations that may be performed by one or more components of the API request risk assessment system of FIG. 1, in accordance with some embodiments.

As explained above, the PDP 124 may control which API requests cause authentication or other testing to be performed on the source computer application. FIG. 3 is a flowchart of various operations that can be performed by the PDP 124 to control which API requests result in sending of an attack response message to the source computer application. Referring to FIG. 3, the PDP 124 may determine (block 300) whether content of the API request satisfies a risk assessment rule, and can selectively send (block 308), by controlling whether the PEP 122 sends, the attack response message to the source computer application based on the determination. The PDP 124 may, for example, determine whether a value or string parameter contained in the API request satisfies a defined rule, and/or determine whether a sequence of defined parameters contained in the API request satisfies a defined rule.

The PDP 124 may determine (block 302) whether a pattern of API requests received from the source computer application satisfies a risk assessment rule, and can selectively send (block 308) the attack response message to the source computer application based on the determination. For example, it may determine whether a sequence of API requests containing defined parameters is received from the source computer application.

The PDP 124 may determine (block 304) whether an identifier for the source computer application is among a list of trusted source computer applications, and can selectively send (block 308) the attack response message to the source computer application based on the determination. For example, the PDP 124 can control the PEP 122 to send the attack response message if the identifier for the source computer application is not among the list of trusted source computer applications, and to not send the attack response message if the identifier is among the list of trusted source computer applications).

The PDP 124 may determine (block 306) whether an identifier for the source computer is among a list of trusted source computers, and can selectively send (block 308) the attack response message to the source computer application based on the determination. For example, the PDP 124 can control the PEP 122 to send the attack response message if the identifier for the source computer is not among the list of trusted source computers, and to not send the attack response message if the identifier is among the list of trusted source computers).

The PDP 124 can generate (block 204) a risk assessment score based on one or more of the determinations, and send (block 206) the risk assessment score to the PEP 122 to control whether an attack response message is sent to the source computer application. The risk assessment score can indicate a level of trustworthiness of the source computer and/or the source computer application.

With further reference to FIG. 2, the PDP 124 may generate (block 204) a risk assessment score based on a characteristic of the source computer application, and may generate the risk assessment score based on whether characteristics of a sequence of API requests received from the source computer application satisfies a rule defining what characteristics of a sequence of API requests are acceptable to be received from an application having the identified characteristic. The PDP 124 may determine what type of information will be accessed by the API requests in the sequence when processed by the destination computer application, and then generate the risk assessment score based on comparison of the type of information that will be accessed to acceptable types of information defined by the rule. The PDP 124 can keep track of characteristics of API requests in a sequence from a same source computer application, from a same source computer, from a plurality of source computers, etc., to generate improved assessments of trustworthiness of the source computer application(s).

Tracking such sequences may be useful to detect when people try to hack systems by relying upon the fact that the web is not statefull (e.g., each API request contains all information needed to process that request without expecting the destination computer 110 to have retained state information from one or more related earlier API requests). Such hackers can attempt to then deviate from a logical or expected sequence to, for example, obtain access to system resources and/or application information for which they are not authorized to access. The PDP 124 can thereby observe sequences and/or timing of API requests and compare such observations to an expected sequence and/or timing of API requests to determine whether it is a trustworthy (e.g., valid) sequence that is expected from a trustworthy source computer application.

The risk assessment score may furthermore be generated based on a type of device (e.g., mobile phone) that generated the request, a particular type of application (e.g., an application on an iPhone versus an android phone) that generated the request, a type of device operating system, a type of network through which a request is communicated, a particular device ID of the source computer 100, or any other characteristic of the source computer 100 or intervening system components. The PEP 122 and/or the PDP 124 may perform a deep inspection of content of an API request, and compare the content to expected types of variable/field values and ranges of variable/field values, and/or comparison between values of content variables/fields, and generate the risk assessment score based thereon. The PEP 122 and/or the PDP 124 may determine the type of application and/or device of the source computer 100 (e.g., Apple IOS device, Android OS device, Windows OS device, Unix OS device, etc.), and determine based thereon whether an attack response message will be sent to the source computer application to determine its trustworthiness (e.g., authenticity).

The PDP 124 may assess each API request separately (e.g., transaction-by-transaction) or may apply risk assessment rules to assess a sequence of API requests to identify trends or patterns that are indicative or trustworthiness of the source computer application outputting the API requests. The PDP 124 can generate the risk assessment score based on a information that characterizes API requests received by a plurality of the policy enforcement points. The PDP 124 can compare individual API requests, sequences, and/or trends from information characterizing API requests received from a plurality of source computers 100 processing what appears to be the same application, and/or which is provided by a plurality of different PEPs 122.

Further operations that may be performed by the PEP 122 to generate an attack response message that is sent (block 208) to the source application computer are explained in further detail below. The PEP 122 generates the attack response message configured to trigger operation of a defined action by a trustworthy (e.g., authentic) source computer application. This testing of the source computer application can arise from an expectation that an unauthentic application does not contain the underlying programming of an authentic source computer application that would cause it to have the same criteria for triggering operation as a defined action performed by a trustworthy application and/or to generate the same observable output result as a defined action performed by a trustworthy application.

The PEP 122 may contain or be communicatively connected to a repository of information that defines the syntax of response messages that can be properly and/or improperly received by source computer applications. The PEP 122 can determine from the information what syntax can be used in response messages to trigger operation of a defined action by the source computer application. Because different types of source computer applications will have different acceptable response message syntax, the repository may be queried based on an identifier for a source computer application to determine relevant syntax information. The PEP 122 repository of information may be defined by a system operator or automatically programmed with information that is learned over time by, for example, observing API requests and response messages with a source computer application to determine what response messages are observed to trigger operation of a defined action by the source computer application. The learning process may be performed while the source computer application is off-line.

Figure 4:
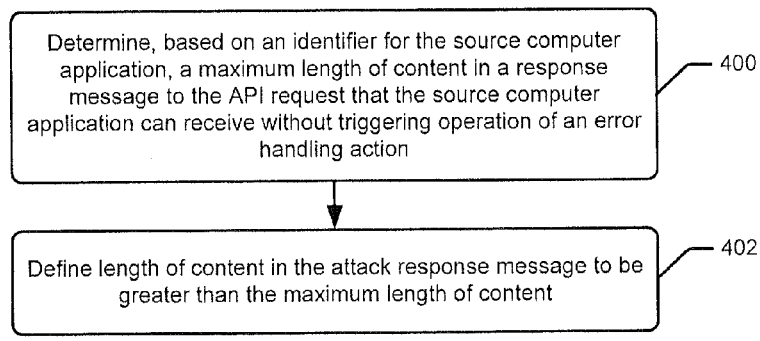

Referring to the operations illustrated in the flowchart of FIG. 4, the PEP 122 can determine (block 400), based on an identifier for the source computer application, a maximum length of content in a response message to the API request that the source computer application can receive without triggering operation of the defined action. The PEP 122 can then define (block 402) length of content in the attack response message to be greater than the maximum length of content. For example, when an authentic application has a known maximum buffer size in which to store a string contained in a response message to an API request, the PEP 122 can generate the attack response message to contain a string that exceeds by defined amount the known maximum buffer size, so that the string overflows the buffer to trigger operation of an error handling action that will output a defined message. An unauthentic application would likely have a different maximum buffer size and therefore the string would be unlikely to overflow the buffer and trigger operation of an error handling action. The amount by which the string is configured to overflow the buffer can be defined to be sufficiently small (e.g., one stream character more than the known maximum buffer size) to more accurately distinguish an authentic application from an unauthentic application. The risk assessment system can therefore determine whether the source computer application is trustworthy based on whether the attack response message triggered operation of the error handling action.

Figure 5:
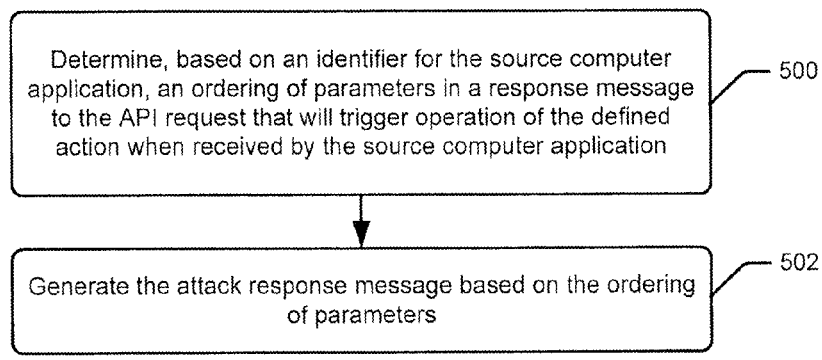

Referring to the operations illustrated in the flowchart of FIG. 5, the PEP 122 can determine (block 500), based on an identifier for the source computer application, an ordering of parameters in a response message to the API request that will trigger operation of the error handling action or other defined action when received by the source computer application. The PEP 122 can then generate (block 502) the attack response message based on the ordering of parameters. For example, when an authentic application is known to trigger operation of an error handling action or other defined action if the order of two defined parameters (e.g., a numerical parameter followed by a string parameter) in a response message to an API request are reversed (e.g., a string parameter followed by a numerical parameter). An unauthentic application would likely not handle reversal of such parameters in the same manner observable by the PEP 122 as an authentic application and, more particularly, would not contain the error handling action or other defined action has an authentic application and therefore would not generate the same observable output.

Figure 6:
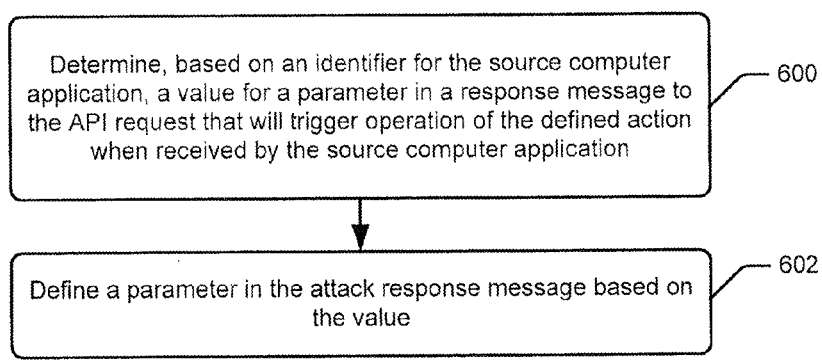

Referring to the operations illustrated in the flowchart of FIG. 6, the PEP 122 can determine (block 600), based on an identifier for the source computer application, a beyond range value for a parameter in a response message to the API request that will trigger operation of an error handling action or other defined action when received by the source computer application. The PEP 122 can then define (block 602) a parameter in the attack response message based on the beyond range value. For example, an authentic application can have a known range of values that are accept to be received in a response message to an API request, and be known to respond to receiving a parameter having a value that is outside the range of values (referred to as a "beyond range value") by triggering operation of an error handling action or other defined action. The PEP 122 can generate the attack response message to define a parameter in the attack response message based on the beyond range value, such as by defining the parameter to include a value that is greater than a maximum range of values acceptable to the authentic application or by defining a parameter to include a value that is less than the minimum range of values acceptable the authentic application.

Figure 7:
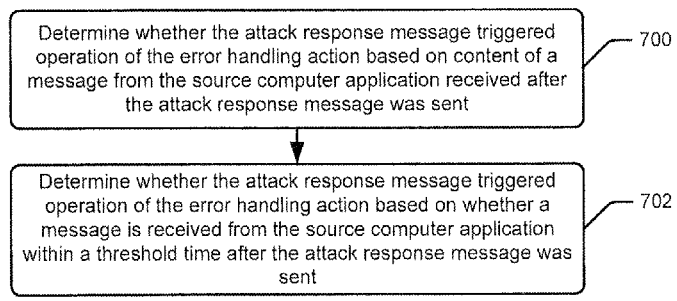

Further operations that may be performed by the PEP 122 to determine whether the attack response message triggered operation of a defined action by the source computer application are explained in further detail below. As explained above, the defined action may generate (block 212) a message that is sent to the PEP 122 and/or that is sent elsewhere but is directly or indirectly observable by the PEP 122. The defined action may alternatively or additionally generate an event, such as by storing a value or string in a register or memory location, that is directly or indirectly observable by the PEP 122. The PEP 122 can determine whether the attack response message triggered operation of the defined action based on one or more of the determination operations illustrated in the flowchart of FIG. 4. Referring to FIG. 7, when the defined action causes a message to be generated, the PEP 122 can determine (block 700) whether the message, received from the source computer application after the attack response message was sent, contains content that satisfies a defined rule. The PEP 122 may determine, for example, whether the message contains a defined value, a value within a defined range, a defined string, a defined sequence of parameters, or other defined content that satisfies the defined rule for what is expected to be contained in a message generated by operation of a defined action in a trustworthy (e.g., authentic) source computer application responsive to its receipt of the attack response message.

The PEP 122 can determine (block 702) whether a message is received from the source computer application within a threshold time after the attack response message was sent. If a message is received within the threshold time, then the source computer application can be determined to be trustworthy (e.g., authentic).

Figure 8:
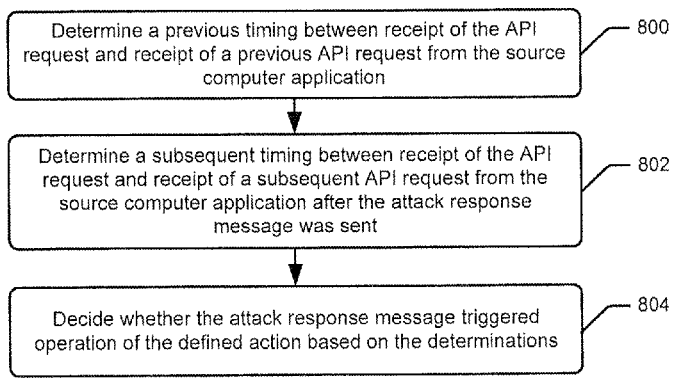

According to other operations illustrated in the flowchart of FIG. 8, the PEP 122 determines (block 800) a previous timing between receipt of the API request and receipt of a previous API request from the source computer application, and determines (block 802) a subsequent timing between receipt of the API request and receipt of a subsequent API request from the source computer application after the attack response message was sent. The PEP 122 determines (block 804) whether the attack response message triggered operation of the defined action based on the previous timing and the subsequent timing. The PEP 122 may determine a communication delay between the source computer application and an API request risk assessment system, and determine (block 804) whether the attack response message triggered operation of the defined action based on the previous timing, the subsequent timing, and the communication delay.

The PEP 122 may thereby, for example, determine that the source computer application is trustworthy (e.g., authentic) when the difference between the difference between the previous timing and the subsequent timing, and perhaps also accounting for communication delay, is less than a threshold time indicating that the subsequent API request was sent responsive to an expected operation of the defined action by the source computer application, as opposed to an expected longer delay if an untrustworthy (e.g., unauthentic) is making another improper attempt to gain access to the destination computer 110 after an earlier failed attempt.

Further operations that may be performed by the PEP 122 to control (block 216 of FIG. 2) deliverability of API request based on whether the defined action was triggered, are explained in further detail below with regard to the flowcharts of FIG. 9-11. The PEP 122 may, based on determining that the attack response message did not trigger operation of the defined action (e.g., no message containing defined content was received within a threshold time of the sending attack response message, and/or the observed event generated by the defined action does not satisfy a defined rule for what was expected to be generated by a trustworthy application), discard the API request without delivering it to the source computer 110, and/or initiate further authentication through an authentication challenge process that attempts to authenticate an application on the source computer 100 that generated (block 212) the API request, a person operating the application on the source computer 100, etc.

Figure 9:
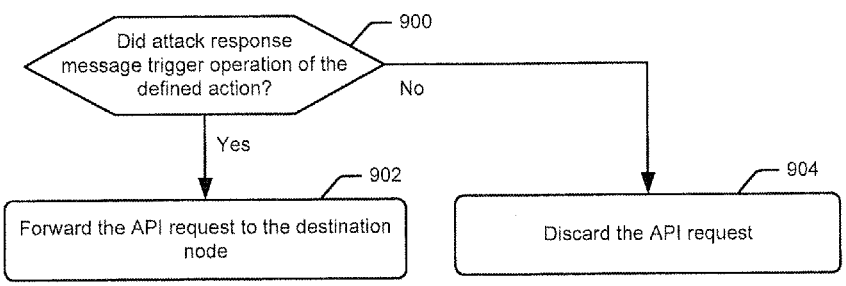

Referring to FIG. 9, the PEP 122 determines (block 900) whether the attack response message triggered operation of the defined action. The PEP 122 forwards (block 902) the API request to the destination computer application based on the determining that the defined action was triggered. In contrast, the PEP 122 discards (block 904) the API request to prevent its processing by the application of the destination computer application based on the determining that the defined action was not triggered. By discarding (block 904) the API request, applications and resources of the destination computer 110 are protected from possible API based intrusion attacks and other malicious or unauthorized operations that may occur if the API request was allowed to be processed by an application on the destination computer 110. A denial of service message may be communicated back to the source computer application when an API request is discarded, if the source computer application supports such feedback in its API request protocol.

Figure 10:
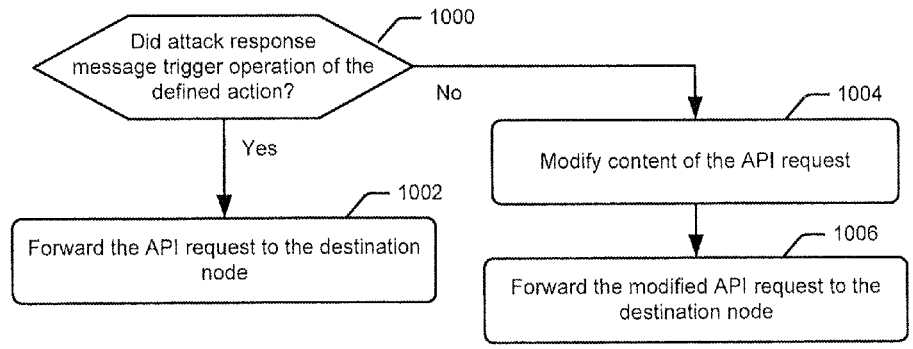
Figure 11:
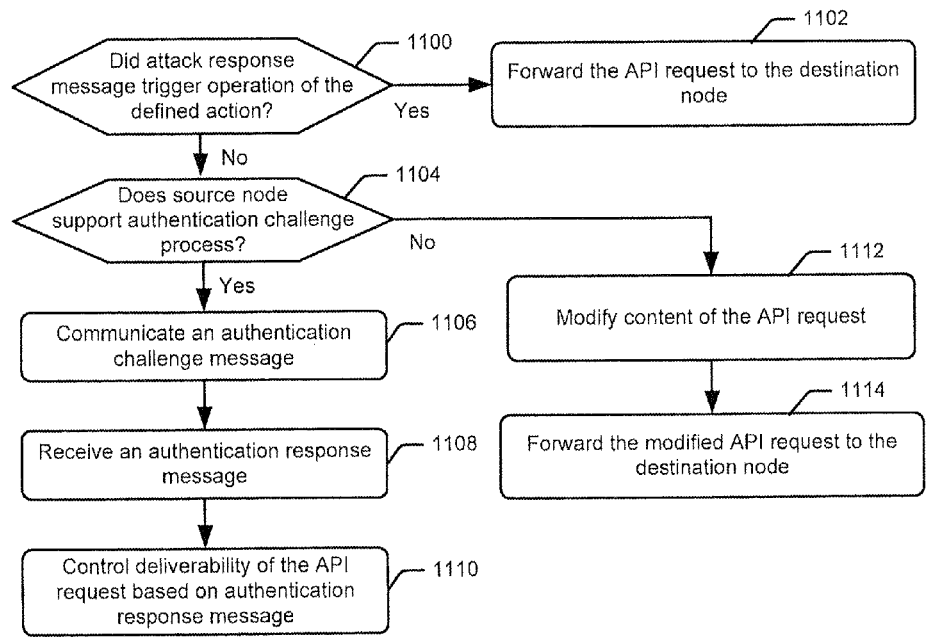

Referring to FIG. 10, the PEP 122 determines (block 1000) whether the attack response message triggered operation of the defined action, and forwards (block 1002) the API request to the destination computer application based on determining that the defined action was triggered. In contrast, the PEP 122 modifies (block 1004) content of the API request to generate a modified API request based on determining that the defined action was not triggered, and forwards (block 1006) the modified API request to the destination computer application. The PEP 122 may modify (block 1004) content by modifying a variable contained in the modified API request that constrains what type of information will be accessed by the modified API request when processed by the destination computer application.

An example is if an API request is querying a sensitive database (destination computer application). While some information from the database may be provided to the source computer application at a normal rate, other information may be provided at a slower controlled rate to allow continued inspection of the risk of allowing access to the source computer application. If the continued inspection of the source computer application's response to the attack response message results in determination that it is sufficiently untrustworthy, the PEP 122 can terminate any further providing of information from the database to the source computer application. The risk assessment system 120 may configure the PEP 122 to modify an API request that is requesting 100 rows of information to instead request access to only 20 rows of information if the source computer application is determined to be sufficiently untrustworthy.

The PEP 122 may perform a further authentication challenge of the source computer application based on whether the attack response message triggered operation of the defined action. Referring to FIG. 11, when the defined action is determined (block 1100) to have been triggered, the PEP 122 can forward (block 1102) the API request to the destination computer application for processing. Otherwise, when the defined action is determined (block 1100) to have not been triggered, the PEP 122 can further determine (block 1104) whether the source computer 100 supports an authentication challenge process. When the authentication challenge process is supported, the PEP 122 communicates (block 1106) an authentication challenge message to the source computer 100 that attempts to authenticate the source computer 100, the application that generated (block 200) the API request, a person operating the source computer 100, etc. The PEP 122 receives (block 1108) an authentication response message from the source computer 100, which may contain identification information for the source computer application and/or for the source computer 100, and/or which may contain an authentication key or other authentication information (which may be based on one or more authentication processes and technologies known in the art). The PEP 122 validates content of the authentication response message and can control (block 1110) deliverability of API request based on whether or not the authentication response message was properly validated. For example, when the PEP 122 determines that credentials received in the API request are invalid or otherwise suspicious (e.g., based on a defined validation rule or other risk assessment rule), the PEP 122 may discard the API request without delivering it to the source computer 110.

In contrast, when the authentication challenge process is not supported, the PEP 122 can modify (block 1112) content of the API request to generate a modified API request, and forward (block 1114) the modified API request to the destination computer application. Instead of modifying content of the API request, the PEP 122 may discard the API request to prevent its processing by the destination computer application.

The PDP 124 may operate with the PEP 122 to stop an API request in-flight by having the PEP 122 intercept and hold an API request until it determines (block 214 of FIG. 2) whether the attack response message triggered operation of the defined action, determines therefrom how to control (block 216 of FIG. 2) deliverability of the API request to the destination computer 110 for processing by an application.

Alternatively, the PDP 124 may monitor API requests without introducing delay (or substantial delay) as they are communicated through one or more networks for receipt by the destination computer 110. The PDP 124 may analyze the API requests to identify their trustworthy or untrustworthy characteristics (e.g., identify one or more trustworthiness rules that are satisfied or not satisfied by the determination of whether the defined action was performed) potentially after completion of their processing by the destination computer application, and may cause defined remedial actions to be performed to undo the result of an earlier processed API request that has now been deemed sufficiently untrustworthy. The PDP 124 may alternatively or additionally notify the destination node 110 and/or another network node when an API transaction request is not to be trusted, which may cause the destination node 110 and/or the network node to take a present action with respect to the API transaction request and/or to take a future action with respect to subsequent API transaction requests from the source computer 100. The PDP 124 may furthermore perform operations based on a web access software architecture provided by the RiskMinder™ product by CA Technologies, Inc.

The PEP 122 may apply API request handling policies for access control that control whether or not the API request is delivered to the destination computer 110, and may also include per-message threat detection, message content transformation, rate limiting, and/or routing to one or more defined other computers of the system for further analysis and/or deliverability decision-making. The policies can include performing call-outs to provide context information for one or more API request to one or more PDPs 124 for assessment of trustworthiness of the source computer application.

In another embodiment, instead of the PEP 122 controlling (block 216 of FIG. 2) deliverability of the API request to the destination computer 110 for processing based on the risk assessment score, the PEP 122 may instead forward the API request with a risk assessment score for the source computer application to the destination computer 110. The destination computer 110 can then perform policy decision making based on the risk assessment score to determine whether and/or how it will handle processing of the API request. If the risk assessment score does not satisfy a defined policy, the destination computer 110 may, for example, reject the API request, initiate further authentication through an authentication challenge process that attempts to authenticate the source computer 100, the application that generated (block 200) the API request, a person operating the source computer 100, etc.

Accordingly, operations that the PEP 122 may perform to control deliverability of the API request can include any one or more of: 1) allowing the API request by forwarding it to the destination computer 110; 2) denying the API request by discarding it to prevent its processing by an application of the destination computer 110; 3) delaying delivery of the API request; 4) controlling rate of delivery of a sequence of API requests to the destination computer 110; 5) modifying content of the API request that is then delivered to the destination computer; 6) perform a first/further authentication process before deciding whether to deliver the API request; and 7) other operations described herein. The PEP 122 may map different determinations of what operational action(s) by the source computer application appear to have been triggered by the attack request message, to different operations that the PEP 122 performs to control deliverability of the API request.

The communication interface between the PEP 122 and the PDP 124 may be based on a request and response API. The PEP 122 may communicate (block 202) information to the PDP 124 that characterizes the API request (e.g., syntax and/or timing), the application which generated the API request, a unique device identifier for the source computer 100, and/or one or more custom elements associated with the API request, which may include transport meta data (e.g., query or post parameters, URL, HTTP headers, MOM-headers, etc), API request content (e.g., a credit card number), and/or operational state variables of the PEP 122. The operational state variables of the PEP 122 may include, for example, a current rate at which API requests are being received for a particular API of the application of the destination computer 110 and/or for other applications of the destination computer 110; and/or a current rate at which API requests are being received from a particular application of the source computer 100 and/or from other applications of the source computer 100 or other source computers, etc.

The operations for controlling (block 216 of FIG. 2) deliverability of API requests can include computer/application privilege management. An API request can be handled differently based on an authentication level determined for the source computer application. Different source computer applications can have different authentication levels. When a source computer application has performed an expected defined action, the source computer application can be granted a more trusted authentication level (e.g., a root account), and API requests received from that source computer application can be handled using different deliverability control rules and/or different flow control. For example, the PEP 122 may, depending upon the authentication level of the source computer application, either intercept and hold API requests from that source computer application before selectively delivering to the destination computer 110 or allow uncontrolled delivery to the destination computer 110 with continuing assessment of risk associated with the API requests. The authentication level of the source computer application may be adjusted over time based on comparison of characteristics of a sequence of the API requests and/or outcome of determinations from repetitive testing of error handling responses of the source computer application to risk assessment rules.

Content of the API requests can be modified based on the authentication level of the source computer application. Different data can be thereby be provided by the destination computer depending upon the authentication level of the source computer application. When operating at a root level, API requests from the source computer application can cause the destination computer 110 to provide a greater quantity of information, more sensitive information, etc, in API request responses. For example a root level source computer application that is querying user accounts can be provided a larger set of data (full account details) then a non-root level source computer application that may be provided only the account names and associated name of the persons. The amount of information and/or type of information that is returned responsive to an API request can thereby be dynamically controlled by modification of content of the API request based on the risk assessment score.

The PDP 124 can obtain risk assessment rules from a remote repository(ies) (e.g., a centralized repository used by a plurality of PDPs) and/or an internal repository, and may develop or modify risk assessment rules over time, such as based on feedback received from the PEP 122, the destination computer 110 and/or the source computer 100 and/or application thereon.

Figure 12:
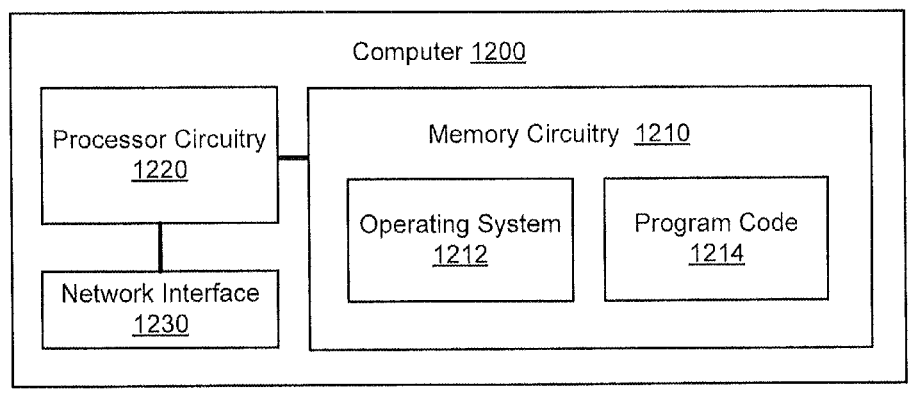
FIG. 12 is a block diagram of a computer that can be configured to perform operations of one or more components of an API request risk assessment system, an API client computer or other source computer, and/or an application server or other destination computer, such as those shown in FIG. 1, in accordance with some embodiments.

FIG. 12 is a block diagram of a computer 1200 that can be configured to perform operations of one or more components (e.g., PEP 122 and/or PDP 124) of the API request risk assessment system 120, the source computer 100, and/or the destination computer 110 of FIG. 1, in accordance with some embodiments. Referring to FIG. 12, the computer 1200 can include a network interface 1230 which communicates via the one or more networks 108a/b with other components of the system. The computer 1200 includes processor circuitry 1220 (processor) and memory circuitry 1210 (memory) that contains computer program instructions, such as an operating system 1212 and application program code 1214 which performs various operations disclosed herein when executed by the processor 1220. The processor circuitry 1220 may include one or more data processing circuits, such as a general purpose and/or special purpose processor (e.g., microprocessor and/or digital signal processor), which may be collocated or distributed across one or more data networks (e.g., networks 108a-b). The processor circuitry 1220 is configured to execute computer program instructions among the program code 1214 in the memory circuitry 1210, described below as a computer readable medium, to perform some or all of the operations and methods for one or more of the embodiments disclosed herein.

Further Definitions and Embodiments

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving an application programming interface (API) request from a source computer application that is directed to a destination computer application;
sending to the source computer application an attack response message configured to trigger operation of an error handling action by the source computer application responsive to the source computer application being authentic;
determining whether the source computer application is authentic responsive to whether the attack response message triggered operation of the error handling action, the source computer application being determined to be authentic responsive to the attack response message triggering operation of the error handling action; and
controlling deliverability of the API request to the destination computer application based on whether the source computer application is determined to be authentic.

2. The method of claim 1, wherein controlling deliverability of the API request to the destination computer application based on whether the source computer application is determined to be authentic, comprises:
forwarding the API request to the destination computer application based on the attack response message triggering operation of the error handling action; and
discarding the API request to prevent its processing by the destination computer application based on the attack response message not triggering operation of the error handling action.

3. The method of claim 1, wherein controlling deliverability of the API request to the destination computer application based on whether the source computer application is determined to be authentic, comprises:
forwarding the API request to the destination computer application based on the attack response message triggering operation of the error handling action; and
modifying content of the API request to generate a modified API request and forwarding the modified API request to the destination computer application based on the attack response message not triggering operation of the error handling action.

4. The method of claim 1, wherein controlling deliverability of the API request to the destination computer application based on whether the source computer application is determined to be authentic, comprises:
communicating an authentication challenge message to the source computer application based on the attack response message not triggering operation of the error handling action, and not communicating the authentication challenge message to the source computer application based on the attack response message triggering operation of the error handling action;
receiving an authentication response message from the source computer application; and
controlling deliverability of the API request to the destination computer application based on content of the authentication response message.

5. The method of claim 1, further comprising:
determining, based on an identifier for the source computer application, a maximum length of content in a response message to the API request that the source computer application can receive without triggering operation of the error handling action responsive to the source computer application being authentic; and providing content in the attack response message having a length that is greater than the maximum length of content so the attack response message triggers operation of the error handling action when received by the source computer application responsive to the source computer application being authentic.

6. The method of claim 1, further comprising:

determining, based on an identifier for the source computer application, an ordering of parameters in a response message to the API request that will trigger operation of the error handling action when received by the source computer application responsive to the source computer application being authentic; and generating the attack response message to have the ordering of parameters so the attack response message triggers operation of the error handling action when received by the source computer application responsive to the source computer application being authentic.

7. The method of claim 1, further comprising:

determining, based on an identifier for the source computer application, a beyond range value for a parameter in a response message to the API request that will trigger operation of the error handling action when received by the source computer application responsive to the source computer application being authentic; and providing a parameter in the attack response message having the beyond range value so the attack response message triggers operation of the error handling action when received by the source computer application responsive to the source computer application being authentic.

8. The method of claim 1, further comprising:

determining a previous timing between receipt of the API request and receipt of a previous API request from the source computer application;

determining a subsequent timing between receipt of the API request and receipt of a subsequent API request from the source computer application after the attack response message was sent; and determining whether the source computer application is authentic based on comparison of the previous timing and the subsequent timing.

9. The method of claim 8, further comprising determining a communication delay between the source computer application and an API request risk assessment system; and determining whether the source computer application is authentic based on comparison of the previous timing, the subsequent timing, and the communication delay.

10. An application programming interface (API) request risk assessment system comprising:

processor circuitry; and memory circuitry coupled to the processor circuitry and comprising computer readable program code that when executed by the processor circuitry causes the processor circuitry to perform operations comprising:

receiving an API request from a source computer application that is directed to a destination computer application;

sending to the source computer application an attack response message configured to trigger operation of a error handling action by the source computer application responsive to the source computer application being authentic;

determining whether the source computer application is authentic responsive to whether the attack response message triggered operation of the error handling action, the source computer application being determined to be authentic responsive to the attack response message triggering operation of the error handling action; and controlling deliverability of the API request to the destination computer application based on whether the source computer application is determined to be authentic.

11. The API request risk assessment system of claim 10, wherein controlling deliverability of the API request to the destination computer application based on whether source computer application is determined to be authentic, comprises:

forwarding the API request to the destination computer application based on the attack response message triggering operation of the error handling action; and discarding the API request to prevent its processing by the destination computer application based on the attack response message not triggering operation of the error handling action.

12. The API request risk assessment system of claim 10, wherein the operations further comprise:

determining, based on an identifier for the source computer application, syntax of a response message to the API request that will trigger operation of the error handling action by the source computer application when received responsive to the source computer application being authentic; and defining the attack response message based on the syntax of the response message.

13. The API request risk assessment system of claim 10, wherein the operations further comprise:

selectively performing the sending of the attack response message to the source computer application based on whether content of the API request satisfies a risk assessment rule.

14. The method of claim 5, wherein:

determining, based on an identifier for the source computer application, a maximum length of content in a response message to the API request that the source computer application can receive without triggering operation of the error handling action responsive to the source computer application being authentic, comprises determining, based on the identifier for the source computer application, a maximum buffer size that restricts a maximum string length that can be contained in a response message to the API request that the source computer application can store in a buffer without overflowing the buffer and triggering operation of the error handling action responsive to the source computer application being authentic; and providing content in the attack response message having a length that is greater than the maximum length of content so the attack response message triggers operation of the error handling action when received by the source computer application responsive to the source computer application being authentic, comprises providing a string in the attack response message having a length that is greater than the maximum string length so the attack response message overflows the maximum buffer size of the buffer and triggers operation of the error handling action responsive to the source computer application being authentic.

15. The method of claim 6, wherein generating the attack response message to have the ordering of parameters so the attack response message triggers operation of the error handling action when received by the source computer application responsive to the source computer application being authentic, comprises:
providing as content in the attack response message, two defined parameters arranged with the determined ordering of parameters as arguments of the API request so the attack response message triggers operation of the error handling action responsive to the source computer application being authentic.

16. The method of claim 7, wherein:
determining, based on an identifier for the source computer application, a beyond range value for a parameter in a response message to the API request that will trigger operation of the error handling action when received by the source computer application responsive to the source computer application being authentic, comprises
determining a maximum range of values that the source computer application can receive or a minimum range of values that the source computer application can receive responsive to the source computer application being authentic; and
providing a parameter in the attack response message having the beyond range value so the attack response message triggers operation of the error handling action when received by the source computer application responsive to the source computer application being authentic, comprises
providing the parameter in the attack response message to have a value that is greater than the maximum range of values or a value that is less than the minimum range of values.

17. The API request risk assessment system of claim 10, wherein the operations further comprise:
determining, based on an identifier for the source computer application, a maximum length of content in a response message to the API request that the source computer application can receive without triggering operation of the error handling action responsive to the source computer application being authentic; and
providing content in the attack response message having a length that is greater than the maximum length of content so the attack response message triggers operation of the error handling action when received by the source computer application responsive to the source computer application being authentic.

18. The API request risk assessment system of claim 17, wherein:
determining, based on an identifier for the source computer application, a maximum length of content in a response message to the API request that the source computer application can receive without triggering operation of the error handling action responsive to the source computer application being authentic, comprises
determining, based on the identifier for the source computer application, a maximum buffer size that restricts a maximum string length that can be contained in a response message to the API request that the source computer application can store in a buffer without overflowing the buffer and triggering operation of the error handling action responsive to the source computer application being authentic; and
providing content in the attack response message having a length that is greater than the maximum length of content so the attack response message triggers operation of the error handling action when received by the source computer application responsive to the source computer application being authentic, comprises
providing a string in the attack response message having a length that is greater than the maximum string length so the attack response message overflows the maximum buffer size of the buffer and triggers operation of the error handling action responsive to the source computer application being authentic.

19. The API request risk assessment system of claim 10, wherein the operations further comprise:
determining, based on an identifier for the source computer application, an ordering of parameters in a response message to the API request that will trigger operation of the error handling action when received by the source computer application responsive to the source computer application being authentic; and
generating the attack response message to have the ordering of parameters so the attack response message triggers operation of the error handling action when received by the source computer application responsive to the source computer application being authentic.

20. The API request risk assessment system of claim 19, wherein generating the attack response message to have the ordering of parameters so the attack response message triggers operation of the error handling action when received by the source computer application responsive to the source computer application being authentic, comprises:
providing as content in the attack response message, two defined parameters arranged with the determined ordering of parameters as arguments of the API request so the attack response message triggers operation of the error handling action responsive to the source computer application being authentic.

21. The API request risk assessment system of claim 10, wherein the operations further comprise:
determining, based on an identifier for the source computer application, a beyond range value for a parameter in a response message to the API request that will trigger operation of the error handling action when received by the source computer application responsive to the source computer application being authentic; and
providing a parameter in the attack response message having the beyond range value so the attack response message triggers operation of the error handling action when received by the source computer application responsive to the source computer application being authentic.

22. The API request risk assessment system of claim 21, wherein:
determining, based on an identifier for the source computer application, a beyond range value for a parameter in a response message to the API request that will trigger operation of the error handling action when received by the source computer application responsive to the source computer application being authentic, comprises
determining a maximum range of values that the source computer application can receive or a minimum range of values that the source computer application can receive responsive to the source computer application being authentic; and providing a parameter in the attack response message having the beyond range value so the attack response message triggers operation of the error handling action when received by the source computer application responsive to the source computer application being authentic, comprises providing the parameter in the attack response message to have a value that is greater than the maximum range of values or a value that is less than the minimum range of values.

\* \* \* \* \*